United States Patent
Benarous (10) Patent No.: US 11,239,770 B2
(45) Date of Patent: Feb. 1, 2022

(54) MOTOR WITH REGENERATIVE BRAKING RESISTOR

(71) Applicant: Goodrich Actuation Systems Limited, West Midlands (GB)

(72) Inventor: Maamar Benarous, Balsall Common (GB)

(73) Assignee: GOODRICH ACTUATION SYSTEMS LIMITED, West Midlands (GB)

(*) Notice: Subject to any disclaimer, the term of this patent is extended or adjusted under 35 U.S.C. 154(b) by 0 days.

(21) Appl. No.: 16/721,191

(22) Filed: Dec. 19, 2019

(65) Prior Publication Data

US 2020/0259428 A1  Aug. 13, 2020

(30) Foreign Application Priority Data

Feb. 12, 2019  (EP) .................................... 19275019

(51) Int. Cl.
  *H02P 3/18* (2006.01)
  *H02P 3/14* (2006.01)

(52) U.S. Cl.
  CPC ............ *H02P 3/14* (2013.01); *H02P 2207/05* (2013.01)

(58) Field of Classification Search
  CPC .......... H02P 3/14; H02P 3/18; H02P 2207/05; H02P 21/36; H02P 25/22
  See application file for complete search history.

(56) References Cited

U.S. PATENT DOCUMENTS

| 6,013,963 A | 1/2000 | Shelton, Jr. |
| 9,413,200 B2 | 8/2016 | Horisaka et al. |
| 9,912,206 B2 | 3/2018 | Grand et al. |
| 2004/0239202 A1 | 12/2004 | Dooley |
| 2011/0278975 A1 | 11/2011 | Holcomb |

(Continued)

FOREIGN PATENT DOCUMENTS

| BR | PI1006138 A2 | 2/2016 |
| CN | 102386723 B | 3/2012 |

(Continued)

OTHER PUBLICATIONS

European Search Report for Application No. 19275019.8 dated Jul. 18, 2019; 9 pgs.

(Continued)

*Primary Examiner* — Karen Masih
(74) *Attorney, Agent, or Firm* — Cantor Colburn LLP (57) ABSTRACT

There is provided an electric motor comprising a rotor, a stator and a motor controller. The stator comprises a substantially cylindrical body, a plurality of teeth extending from the substantially cylindrical body in a radial direction, one or more first sets of electrical windings that are wound around said teeth and configured to drive the rotor, and one or more second sets of electrical windings electrically separate from the first set of electrical windings. The second set of electrical windings on the stator are electrically connected to the motor controller such that energy produced by the electric motor during a regenerative mode of operation in use is diverted to the second set of electrical windings on the stator for dissipating the energy produced in the regenerative mode.

15 Claims, 6 Drawing Sheets

(56) References Cited

U.S. PATENT DOCUMENTS

2012/0013278 A1* 1/2012 Hanlon .................. H02P 3/18
318/379
2015/0171674 A1 8/2015 Lee et al.

FOREIGN PATENT DOCUMENTS

CN 206099670 U 4/2017
DE 19652186 A1 6/1998

OTHER PUBLICATIONS

CN102386723 (B), published Mar. 21, 2012-[Retrieved on Dec. 17, 2019], Retrieved from the Internet:, URL: https://worldwide.espacenet.com/publicationDetails/biblio? DB=EPODOC&ll=0&ND=3&adjacent=true&FT=D&date=20120321&CC=CN&NR=102386723A&KC=A (2 pages).
CN206099670(U) published Apr. 12, 2017-[Retrieved on Dec. 17, 2019], Retrieved from the Internet:, URL: hhttps://worldwide.espacenet.com/publicationDetails/biblio? ll=0&ND=3&adjacent=true&locale=en_EP&FT=D&date=20170412&CC=CN&NR=206099670U&KC=U (1 page).
DE19652186 (A1) published Jun. 25, 1998-[Retrieved on Dec. 17, 2019], Retrieved from the Internet:, URL:https://worldwide.espacenet.com/publicationDetails/biblio? ll=0&ND=3&adjacent=true&locale=en_EP&FT=D&date=19980625&CC=DE&NR=19652186A1&KC=A1 (1 page).

* cited by examiner

Fig. 6B ically separate from the first set of electrical conductors,
MOTOR WITH REGENERATIVE BRAKING RESISTOR

FOREIGN PRIORITY

This application claims priority to European Patent Application No. 19275019.8 filed Feb. 12, 2019, the entire contents of which is incorporated herein by reference.

FIELD

The present disclosure relates generally to a motor for an electromechanical actuator that incorporates a break resistor in the state of the motor.

BACKGROUND

Electromechanical actuators are known and are used in many fields to actuate one or more components based on an electrical input provided to a motor. Examples of various uses of electromechanical actuators are aerodynamic surfaces, as well as other moving components of an aircraft. In these and other situations the electromechanical actuator is typically required to dissipate the loads that are generated during deceleration or under braking.

Figure 1:
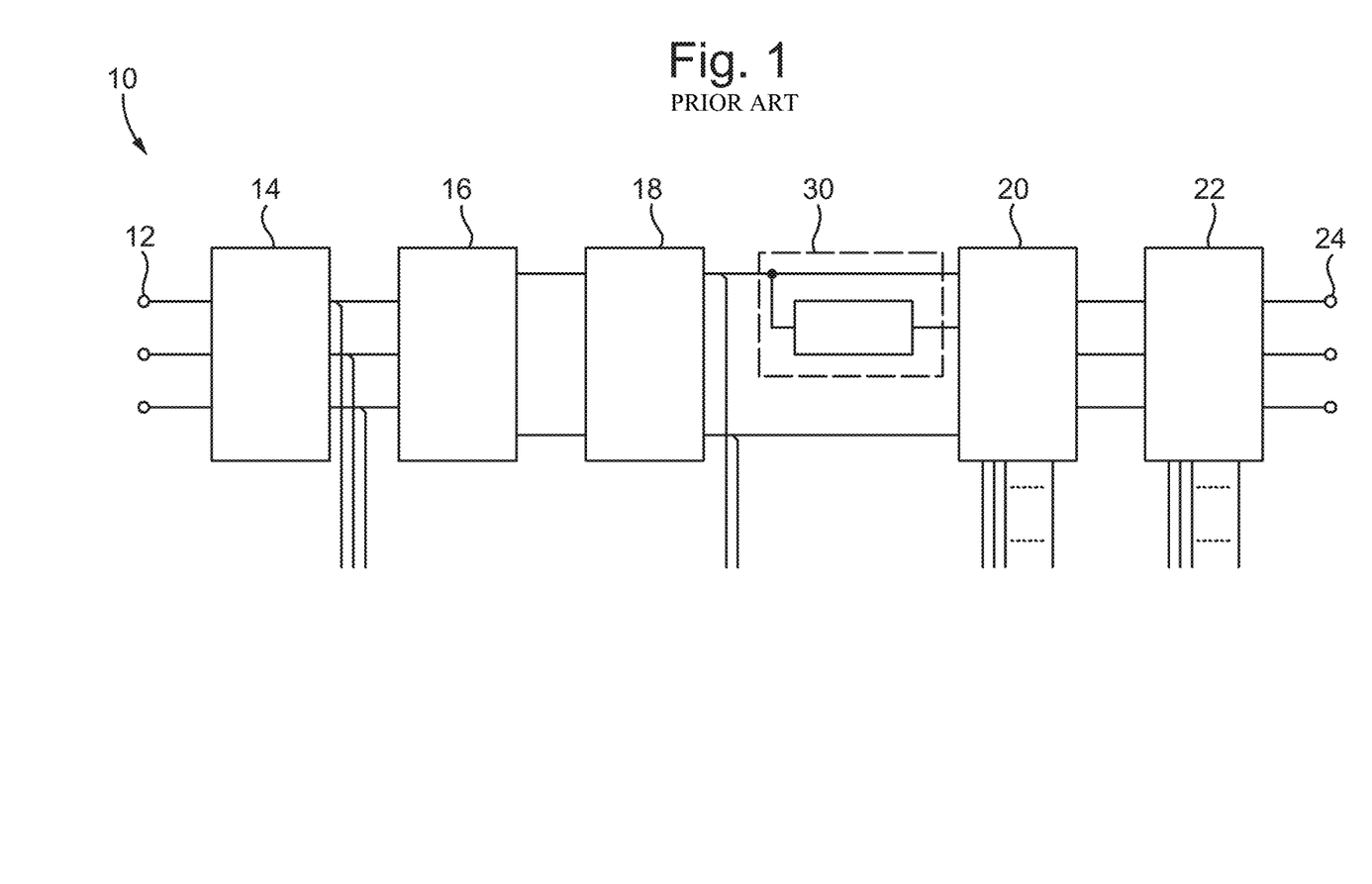
FIG. 1 shows an example architecture of a conventional motor controller.

FIG. 1 shows an example architecture of a conventional motor controller 10 (or "motor drive") for an electromechanical actuator. The motor controller 10 may include one or more of input supply terminals 12 and one or more filters 14 in series with a rectifier 16.

The motor controller 10 may further comprise a braking unit (or "braking chopper") comprising an inverter 20 and brake resistor 30. The inverter 20 may be an insulated-gate bipolar transistor ("IGBT") or other type of electronic switch. A DC capacitor 18 may be provided in the motor controller 10 and is described in more detail below.

The motor controller 10 may include a current feedback device 22 and further comprise motor input terminals 24.

Motor controllers 10 are known that include a brake resistor shown at 30 that is configured to convert the mechanical energy of the motor during deceleration or braking to heat energy, thus dissipating the load generated in this mode. The brake resistor 30 is typically an off-the-shelf component and incorporated into a housing of the motor controller 10.

Figure 2:
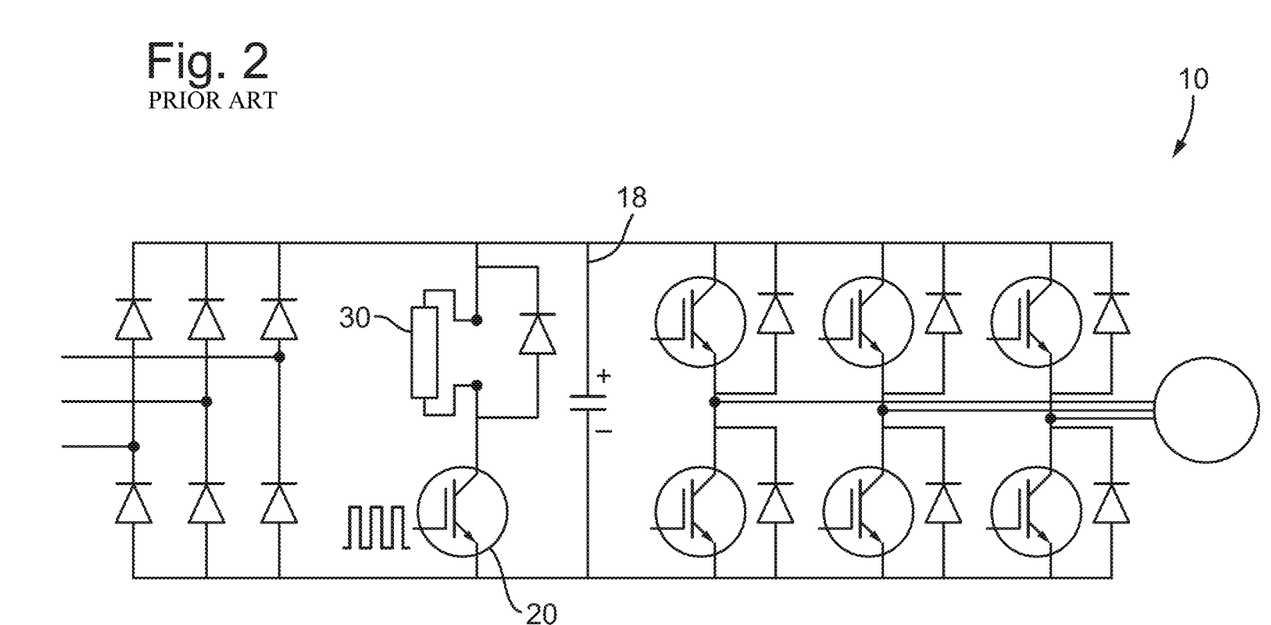
FIG. 2 shows a circuit diagram for the motor controller of FIG. 1.

FIG. 2 shows a circuit diagram for a motor controller 10 according to the conventional motor controller 10 of FIG. 1, in which the brake resistor system is shown in more detail. The inverter or switch 20 may act as a "chopper" and may be configured to control the electric motor current through the brake resistor 30. During a regenerative mode (e.g., braking or deceleration) the inverter 20 may initially be disabled and the energy from the motor will charge the DC capacitor 18 and increase the DC link voltage. Once the DC link voltage exceeds a predetermined value (e.g., due to the load generated by the motor during deceleration or braking) the inverter 20 will be enabled and the energy from the motor will be dissipated in the brake resistor 30 instead, and the DC link voltage will decrease. Once the DC link voltage decreases below a (or the) predetermined value the inverter 20 will be disabled again and the DC link voltage will start increasing. This process will continue with the inverter 20 becoming enabled and disabled based on the DC link voltage exceeding or falling below a (or the) predetermined value. Thus, the inverter 20 can be enabled to dissipate the energy from the motor into the resistor 30, which energy will be converted to heat energy by the resistor 30. This action may be used to control the DC link voltage.

Accordingly, during a regenerative mode of operation (e.g., deceleration or braking) the energy produced by the electric motor is diverted to the brake resistor 30 (e.g., using the inverter 20), so that it is not sent back to the supply terminals 12.

Using an external resistor 30 as shown in FIGS. 1 and 2 has been found to lead to certain problems, for example the size of the resistor must be chosen so as to be capable of absorbing the maximum energy from the motor under all defined conditions, and is typically quite large. This has a big impact on the size of the motor controller 10. In addition, the resistance chosen for the motor controller 10 may not be tailored to the motor, but must be what is available off the shelf. This can lead to problems in the thermal management of the motor.

Some conventional arrangements use loops of resistive wire or damping elements in the stator to provide a damping effect. This is distinct from the use of an external resistor in the motor controller electronics to dissipate energy from the motor in use, as described above, It is desired to provide a regenerative or braking mode of operation in an electric motor for an electromechanical actuator in which the size of the motor controller can be reduced and which can lead to improved thermal management.

SUMMARY

According to an aspect of the present disclosure, there is provided an electric motor comprising a rotor, a stator and a motor controller. The stator comprises a substantially cylindrical body, a plurality of teeth extending from the substantially cylindrical body in a radial direction, one or more first sets of electrical windings that are wound around said teeth and configured to drive the rotor, and one or more second sets of electrical windings electrically separate from the first set of electrical windings. The second set of electrical windings on the stator are electrically connected to the motor controller such that energy produced by the electric motor during a regenerative mode of operation in use is diverted to the second set of electrical windings on the stator for dissipating the energy produced in the regenerative mode.

The above features are intended to remove the need to incorporate a resistor in the motor controller that is configured to dissipate the energy produced by the motor in the regenerative mode, in particular by providing one or more second sets of electrical windings on the stator that perform this function. This means that the size of the motor controller can be reduced, that thermal management of the motor is improved and the braking resistance can be tailored more specifically to the stator.

Aspects of the disclosure extend to a method of constructing the electric motor. For example, one particular method comprises providing a stator comprising a substantially cylindrical body and a plurality of teeth extending from the substantially cylindrical body in a radial direction, winding one or more first sets of electrical conductors around said teeth, wherein the first set(s) of electrical conductors are configured to drive a rotor of the electric motor, winding one or more second sets of electrical conductors on the stator, wherein the second set(s) of electrical conductors are electrically separate from the first set of electrical conductors, and electrically connecting the second set of electrical conductors on the stator to a motor controller of the electric motor such that energy produced by the electric motor during a regenerative mode of operation in use is diverted to the second set of electrical conductors on the stator for dissipating the energy produced in the regenerative mode.

In various embodiments, the stator may comprise one or more pairs of channels extending in an axial direction through the substantially cylindrical body, and one or more second sets of electrical windings that are wound around each pair of channels and configured to resist motion of the motor during deceleration or under braking thereof.

The one or more pairs of channels may comprise at least two separate pairs of channels, and the one or more second sets of electrical windings may comprise at least two separate sets of electrical windings.

At least one of the second set of windings may comprise one or more conductors, each conductor being wound at least 2, 5, 10 or 20 times around the pair of channels.

The one or more conductors may be wound around the pair of channels so that conducting elements are arranged side-by-side in axial portions of each of the second set of windings.

The polarity of conductor elements in the side-by-side arrangement may alternate so that each conductor is arranged next to a conductor having an opposite polarity to its own.

The one or more conductors may include a first conductor element that is wound around a respective pair of channels a specified number of times in a first direction, and a second conductor element that is wound around the same pair of channels the specified number of times in a second direction, wherein the first conductor element has a polarity that is opposite to the second conductor element.

Alternatively, the one or more conductors may include a single conductor element that is wound around a respective pair of channels a specified number of times in a first direction, and then the same conductor element is wound around the same pair of channels a specified number of times in a second, opposite direction.

In various other embodiments, the stator may comprise a slot extending around an outer circumference of the stator, and the one or more second sets of electrical windings are wound around the slot.

The slot may have a width that extends axially between a first circumferential rim of the stator and a second circumferential rim of the stator, wherein the first rim may be located at a first axial end of the stator and the second rim may be located at the second, opposite axial end of the stator.

The second set of electrical windings may comprise one or more conductors that are wound around the slot in substantially a circumferential direction, so that conducting elements are arranged side-by-side around the outer circumference of the stator body.

The polarity of conductor elements in the side-by-side arrangement may alternate so that each conductor is arranged next to a conductor having an opposite polarity to its own.

The one or more conductors may include a first conductor element that is wound around the slot a specified number of times in a first direction, and a second conductor element that is wound around the slot the specified number of times in a second direction, wherein the first conductor element has a polarity that is opposite to the second conductor element.

Alternatively, the one or more conductors may include a single conductor element that is wound around the slot a specified number of times in a first direction, and then the same conductor element may be wound around the slot a (e.g., the) specified number of times in a second, opposite direction.

In any of the embodiments discussed above, the rotor may be a rotary body comprising permanent magnets positioned between the stator and the rotary body. The rotary body may be coaxially rotatable relative to the stator about a central axis.

DETAILED DESCRIPTION

Herewith will be described various embodiments of an electrical motor, for example for an electromechanical actuator, in which a stator of the motor incorporates brake resistor coils, in addition to the motor coils, wherein the brake resistor coils are configured to dissipate braking energy from the motor (and, e.g., the actuator) in a regenerative mode of operation, for example during deceleration or braking of the motor. Aspects of the disclosure extend to the stator used in the motor, which is inventive in its own right and may be claimed independently.

Figure 3A:
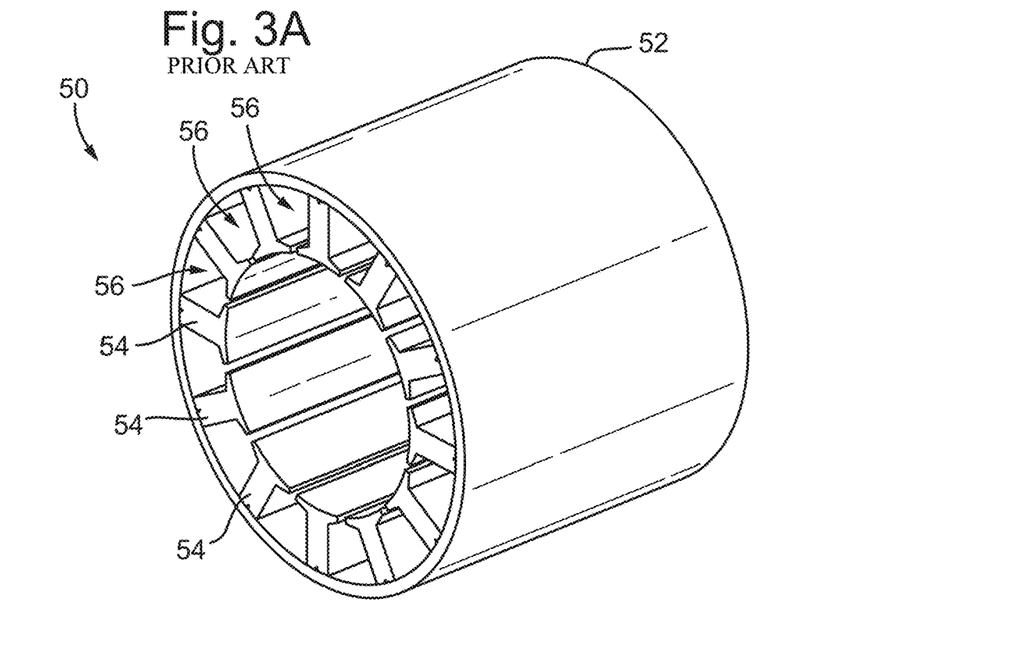
FIG. 3A shows a conventional stator that could be used in conjunction with the motor controller of FIGS. 1 and 2.

For comparison, FIG. 3A shows a conventional stator 50 that comprises a cylindrical body 52, which may be referred to as the back iron, wherein a plurality of teeth 54 extend radially inwards therefrom such that a plurality of circumferentially spaced cavities 56 are formed between the teeth 54. When positioned in use, a plurality of windings will be provided within the cavities 56 and around the teeth 54 as is generally known in the art.

Figure 3B:
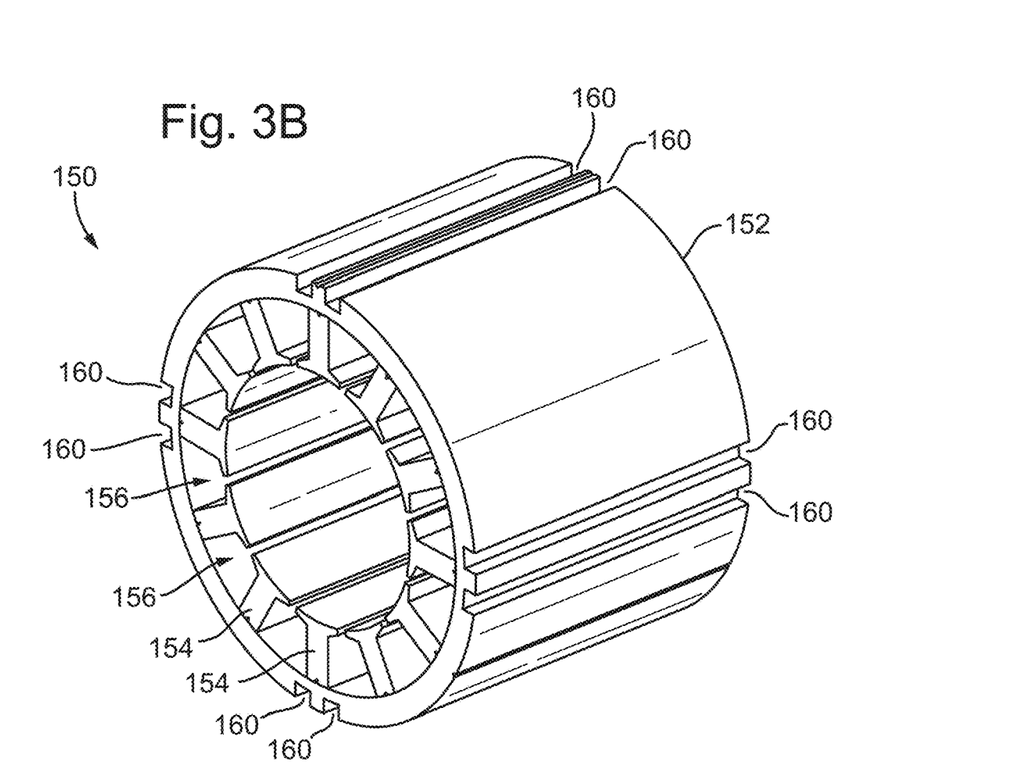
FIG. 3B shows a stator in accordance with the present disclosure that could be used with a slightly modified version of the motor controller of FIGS. 1 and 2.

FIG. 3B shows a stator 150 in accordance with the present disclosure that is substantially similar to the conventional stator 50 shown in FIG. 3A, comprising a substantially cylindrical body 152 (or "back iron"), with teeth 154 extending radially inwards therefrom so as to define a plurality of circumferentially spaced cavities 156 through which a plurality of windings may be provided as is generally known in the art.

As is evident from FIG. 3B, the stator 150 is modified to include a plurality of channels 160 that extend axially and along an outer surface of the body 152 of the stator 150. In the embodiment of FIG. 3B, the channels 160 extend along the entire axial length of the cylindrical body 152 and form a substantially cuboid-shaped void through which various turns of an electrical winding may be provided. As described in more detail below, providing windings through the channels 160 in the body 152 of the stator 150 can provide a regenerative or braking function in the same manner as a conventional brake resistor system.

Figure 4:
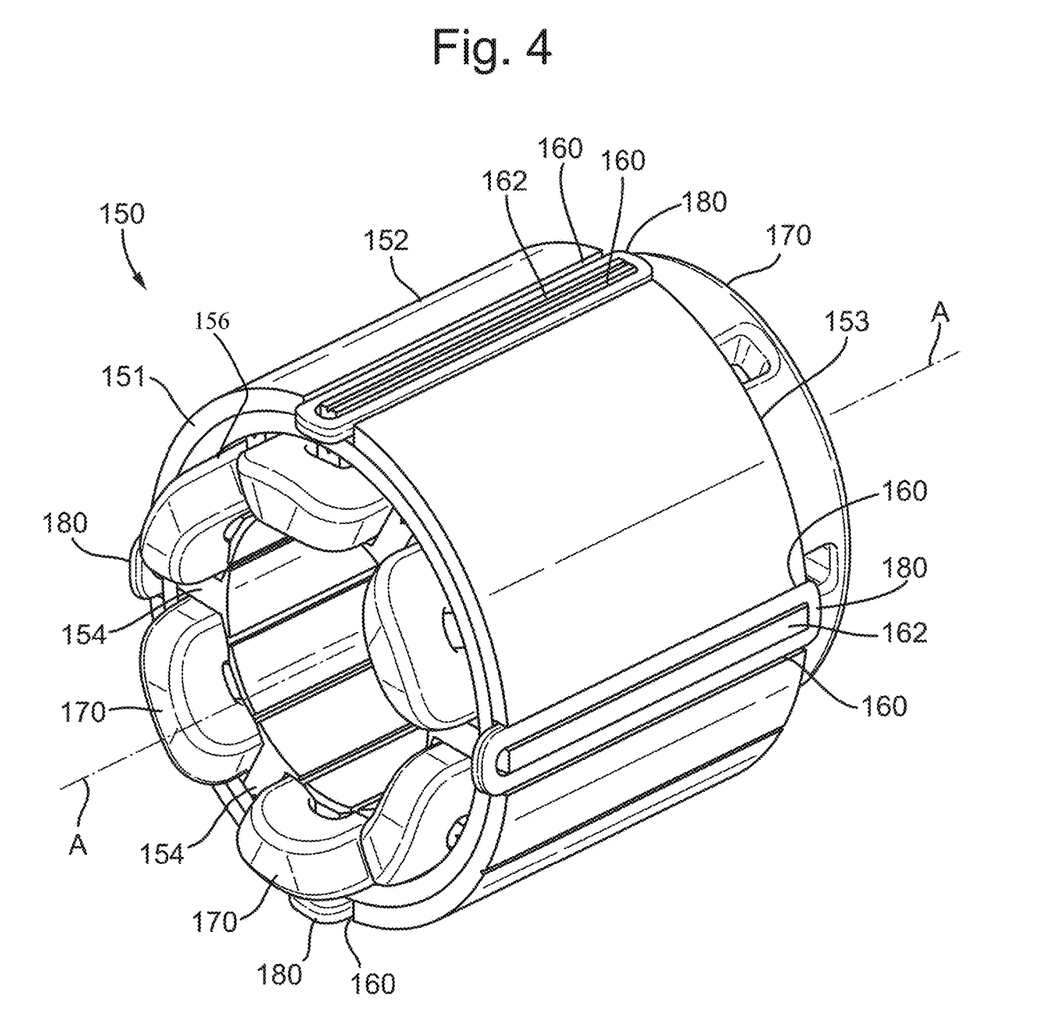
FIG. 4 shows the stator of FIG. 3B in combination with schematic electrical windings (or conductors)

FIG. 4 shows schematically the stator 150 including the various windings that may be provided within the cavities 156, as well as the channels 160. A first set of windings 170 ("motor windings") are provided around the teeth 154 and through the cavities 156, which windings 170 form magnetic poles when energised with current, and are configured to drive a rotor of the motor in use, as is known in the art. In accordance with the disclosure, one or more second sets of windings 180 ("brake resistor windings") are provided within each of the channels 160.

The second sets of windings 180 may each be embedded within the outer cylindrical surface of the body 152 of the stator 150, and may be wrapped around respective protrusions 162 that extend axially from a first axial end 151 of the stator 152 a second, opposite axial end 153 of the stator 150.

The second sets of windings 180 are shown in FIG. 4 is being circumferentially spaced about the circumference of the body 152, and are approximately the same distance radially from a central axis A of the stator 150. Other positional variations are possible, although the sets of windings 180 must each generally extend from the first axial end 151 to the second axial end 153.

During operation of a motor incorporating the stator 150, a variable magnetic flux will be generated inside the body 152 of the stator 150 and the interaction between the magnetic fields within the motor, including the magnetic field of the stator 150 will act to generate force within the motor. In accordance with the disclosure, each of the second sets of windings 180 are connected to a motor controller 10 (or "motor drive"), for example as shown and described in respect of FIGS. 1 and 2. In this manner, the second sets of windings 180 may perform the same function as the brake resistor 30 described above. This has been found to provide a more effective and tailored resistance than the use of a resistor as a separate component within the motor controller electronics.

This is also distinct from various conventional arrangements that may use loops of electrical resistive wire in the back iron, since in these arrangements the resistive wire is shorted so as to create a drag torque and provide a damping mechanism, rather than providing an electrical resistance connected to the motor controller electronics.

Each of the second sets of windings 180 may be connected in series or parallel to achieve the required resistance. The second set(s) of windings 180 may be connected to a DC intermediate circuit of a motor controller, e.g., the DC link including the inverter 20 and brake resistor 30 of the motor controller 10 as shown and described above in respect of FIGS. 1 and 2. In various embodiments, the second sets of windings 180 may be connected to the same terminals as the brake resistor 30 shown in FIGS. 1 and 2.

As will be appreciated from the context of the present disclosure, references to "connected" herein are intended to mean electrically connected, for example via one or more conductors or conducting elements (e.g., electrical wire).

Aspects and embodiments of the present disclosure are aimed at using the regenerative power of a motor, for example when a motor is being rotated during deceleration or under braking load. In these situations the motor may function effectively as a generator, for example feeding power to a DC voltage intermediate circuit within the motor controller. When the voltage within the intermediate circuit reaches a predetermined value, as determined for example by an inverter or other electronic switch, a voltage from the motor may be connected across the second sets of windings 180. This will dissipate the braking energy from the motor.

The broadest aspects of the present disclosure should not be seen as being limited to the arrangement of brake resistor windings 180 as shown in FIG. 4. For example, although the brake resistor windings should be located on the stator itself, alternative arrangements may include the windings provided in a different number or orientation whilst providing the resistive function described herein.

Figure 5:
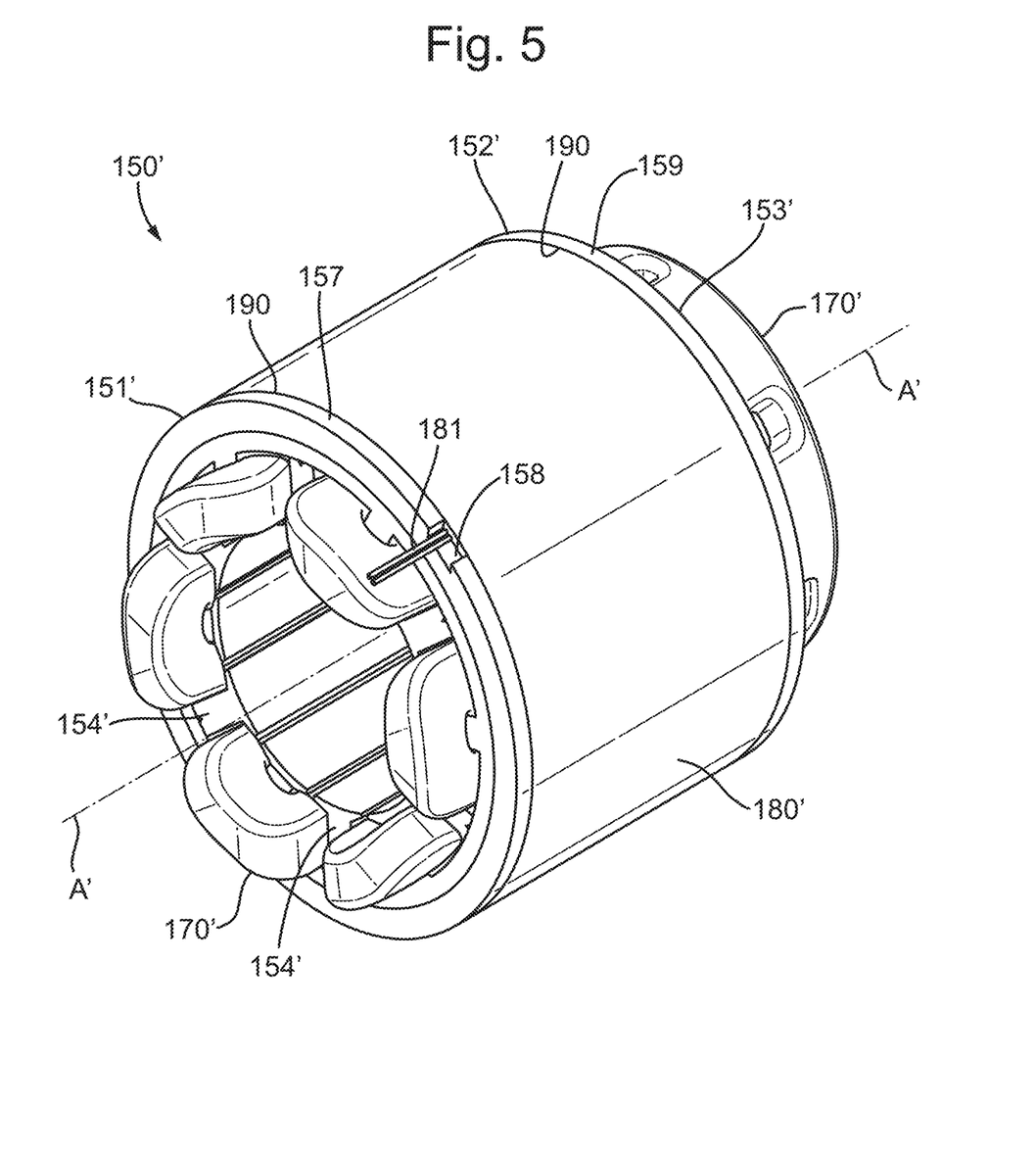
FIG. 5 shows an alternative stator in accordance with the present disclosure.

FIG. 5 shows one example of an alternative embodiment, in which like reference numerals indicate like elements to those shown in FIG. 4, and which shows a stator 150' in which a slot 190 may be formed around the circumference of the stator 150'. The slot 190 may extend axially between a first rim 157 and a second rim 159, wherein the first rim 157 is located at the first axial end 151' of the stator 150' and the second rim is located at the second, opposite axial end 153' of the stator 150'. Both the first and second rims 157, 159 extend substantially completely around the circumference of the body 152'. One of the rims (in the illustrated example the first rim 157') may be provided with an axially extending slot 158 to permit one or more conductors 181 to pass through.

A resistor winding 180' made up of the one or more conductors 181 may be wound around the body 152' of the stator 150' so that the winding 180' completely fills the slots 190. In this manner, the winding 180' will form a resistance in the same manner as the windings 180 shown in FIG. 4. This embodiment will be slightly less complex than that of FIG. 4 and will achieve similar effects whilst being relatively inexpensive.

The above arrangements achieve a method of dissipating the energy from the electrical motor in a regenerative or braking mode of operation. This is achieved by connecting the resistor windings 180, 180' to the motor controller in a similar manner as a brake resistor, such as brake resistor 30 in the motor controller 10 discussed above and referred to in respect of FIGS. 1 and 2. These arrangements can be applied to direct drive applications, but also higher speed (e.g., geared) applications in which the actuator connected to the motor is geared, for example to reduce the size of the motor.

Generally, the embodiments disclosed herein can reduce the weight of the motor controller. For example, the arrangements disclosed herein remove the requirement to have a conventional brake resistor system 30 as shown in FIGS. 1 and 2, as well as the need to choose a suitable resistor for such system 30 within the motor controller. In contrast, by using the sets of windings 180, 180', the resistance can be designed and optimized for specific stators, rather than being limited to off-the-shelf resistors.

The described arrangements also lead to improved thermal management of the motor controller 10, since the energy from the motor does not need to be dissipated within the controller itself. Instead, the energy will be dissipated in the resistor windings in the electric motor, which by its own nature has a bigger thermal mass, and, e.g., surface area to help improve thermal dissipation.

Further refinements can be made to the arrangements described that optimize the magnetic flux throughout the stator 150, 150', and in particular induced within the winding (s) 180, 180'. For example, it has been found that the winding(s) 180, 180' located on the body 152, 152' of the stator 150, 150' could have an inductive contribution, which may be undesirable. To significantly reduce this the conductors within the windings 180, 180' may be wound such that the polarity of adjacent (e.g., side-by-side) conductors is opposite, so that the flux induced by each conductor will be reduced by its adjacent counterpart.

Figure 6A:
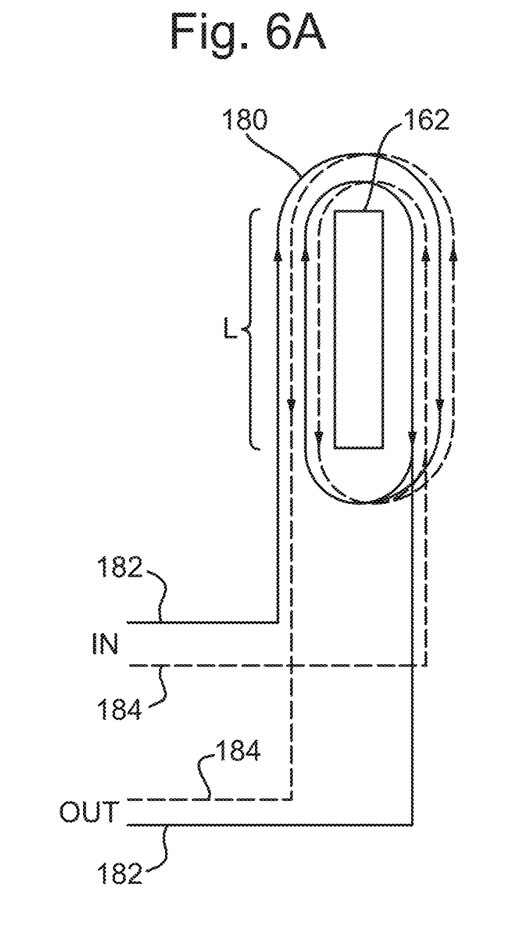
FIGS. 6A and 6B show schematically how one or more conductors could be wound to form the brake resistor windings on the stator.

FIG. 6A shows an example of this in a parallel arrangement, and which schematically indicates the conductors within a winding 180 (FIG. 4) that is wrapped around one of the protrusions 162 extending axially from one end 151 of the stator 150 to the other 153. As can be seen from FIG. 6A, a first conductor 182 is wound around the protrusion 162, and a second conductor of opposite polarity is wound in the opposite direction around the protrusion 162 in such a manner that along an axial length L of the protrusion 162 the first and second conductors 182, 184 are substantially parallel, and are positioned adjacent (e.g., side-by-side) to each other in an alternating relationship such that adjacent (e.g., side-by-side) conductors have opposite polarity to reduce the flux induced by each conductor as discussed above.

Figure 6B:
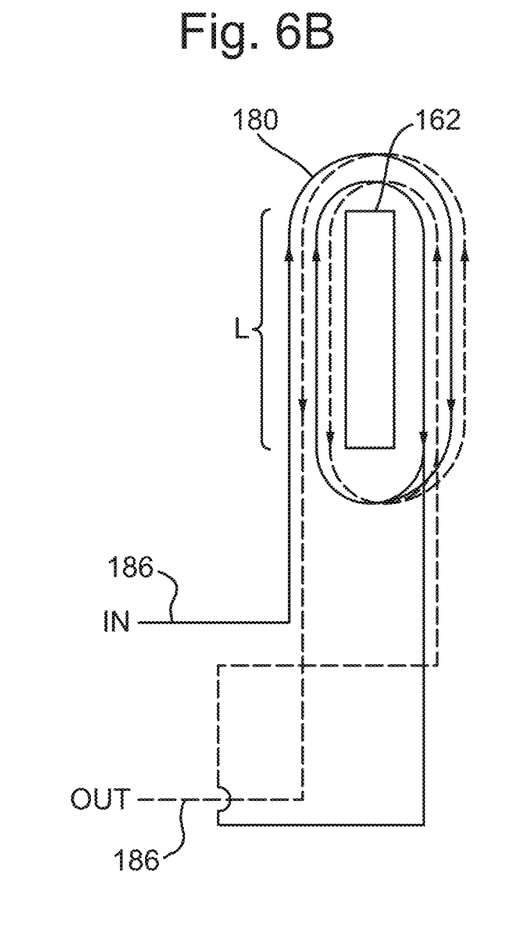

FIG. 6B shows an alternative example of this concept in a series arrangement, in which a single conductor 186 is shown schematically as being wound around the protrusion 162 a number of times, and then reversed in direction so that it is wound in the opposite direction around the protrusion 162 an equal number of times such that the single conductor 186 comprises substantially parallel portions along an axial length L of the protrusion 162, which are positioned adjacent (e.g., side-by-side) to each other in an alternating relationship such that adjacent (e.g., side-by-side) conductor portions have opposite polarity to reduce the flux induced by each conductor as discussed above.

These principles can be applied to the embodiment of FIG. 5, such that as the conductor(s) 181 forming the windings 180' may be wound such that the polarity of adjacent (e.g., side-by-side) conductors is opposite, so that the flux induced by each conductor will be significantly reduced by its adjacent counterpart.

Although the present disclosure has been described with reference to various embodiments, it will be understood by those skilled in the art that various changes in form and detail may be made without departing from the scope of the invention as set forth in the accompanying claims.

What is claimed is:

1. An electric motor comprising a rotor, a stator and a motor controller, the stator comprising:
    a cylindrical body;
    a plurality of teeth extending from the cylindrical body in a radial direction;
    one or more first sets of electrical windings that are wound around said teeth and configured to drive the rotor; and
    one or more second sets of electrical windings electrically separate from the first set of electrical windings,
    wherein the second set of electrical windings on the stator are electrically connected to the motor controller such that energy produced by the electric motor during a regenerative mode of operation in use is diverted to the second set of electrical windings on the stator for dissipating the energy produced in the regenerative mode;
    wherein the stator comprises one or more pairs of channels extending in an axial direction through the cylindrical body, and one or more second sets of electrical windings that are wound around each pair of channels and configured to resist motion of the motor during deceleration or under braking thereof.

2. An electric motor as claimed in claim 1, wherein the one or more pairs of channels comprises at least two separate pairs of channels, and the one or more second sets of electrical windings comprise at least two separate sets of electrical windings.

3. An electric motor as claimed in claim 1, wherein at least one of the second set of windings comprises one or more conductors, each conductor being wound at least 2 times around the pair of channels.

4. An electric motor as claimed in claim 3, wherein the one or more conductors are wound around the pair of channels so that conducting elements are arranged side-by-side in axial portions of each of the second set of windings.

5. An electric motor as claimed in claim 4, wherein the polarity of conductor elements in the side-by-side arrangement alternates so that each conductor is arranged next to a conductor having an opposite polarity to its own.

6. An electric motor as claimed in claim 4, wherein the one or more conductors include a first conductor element that is wound around a respective pair of channels a specified number of times in a first direction, and a second conductor element that is wound around the same pair of channels the specified number of times in a second direction, wherein the first conductor element has a polarity that is opposite to the second conductor element.

7. An electric motor as claimed in claim 4, wherein the one or more conductors include a single conductor element that is wound around a respective pair of channels a specified number of times in a first direction, and then the same conductor element is wound around the same pair of channels a specified number of times in a second, opposite direction.

8. An electric motor as claimed in claim 1, wherein the rotor is a rotary body comprising permanent magnets positioned between the stator and the rotary body, and the rotary body is coaxially rotatable relative to the stator about a central axis.

9. An electric motor comprising a rotor, a stator and a motor controller, the stator comprising:
    a cylindrical body;
    a plurality of teeth extending from the cylindrical body in a radial direction;
    one or more first sets of electrical windings that are wound around said teeth and configured to drive the rotor; and
    one or more second sets of electrical windings electrically separate from the first set of electrical windings,
    wherein the second set of electrical windings on the stator are electrically connected to the motor controller such that energy produced by the electric motor during a regenerative mode of operation in use is diverted to the second set of electrical windings on the stator for dissipating the energy produced in the regenerative mode;
    wherein the stator comprises a slot extending around an outer circumference of the stator, and the one or more second sets of electrical windings are wound around the slot.

10. A electric motor as claimed in claim 9, wherein the slot has a width that extends axially between a first circumferential rim of the stator and a second circumferential rim of the stator, wherein the first rim is located at a first axial end of the stator and the second rim is located at the second, opposite axial end of the stator.

11. A electric motor as claimed in claim 9, wherein the second set of electrical windings comprises one or more conductors that are wound around the slot in substantially a circumferential direction, so that conducting elements are arranged side-by-side around the outer circumference of the stator body.

12. A electric motor as claimed in claim 11, wherein the polarity of conductor elements in the side-by-side arrangement alternates so that each conductor is arranged next to a conductor having an opposite polarity to its own.

13. A electric motor as claimed in claim 11, wherein:
the one or more conductors include a first conductor element that is wound around the slot a specified number of times in a first direction, and a second conductor element that is wound around the slot the specified number of times in a second direction, wherein the first conductor element has a polarity that is opposite to the second conductor element; or
the one or more conductors include a single conductor element that is wound around the slot a specified number of times in a first direction, and then the same conductor element is wound around the slot a specified number of times in a second, opposite direction.

14. A method of constructing an electric motor, comprising:
providing a stator comprising a cylindrical body and a plurality of teeth extending from the cylindrical body in a radial direction;
winding one or more first sets of electrical conductors around said teeth, wherein the first set(s) of electrical conductors are configured to drive a rotor of the electric motor;
winding one or more second sets of electrical conductors on the stator, wherein the second set(s) of electrical conductors are electrically separate from the first set of electrical conductors; and
electrically connecting the second set of electrical conductors on the stator to a motor controller of the electric motor such that energy produced by the electric motor during a regenerative mode of operation in use is diverted to the second set of electrical conductors on the stator for dissipating the energy produced in the regenerative mode;
wherein the stator comprises one or more pairs of channels extending in an axial direction through the cylindrical body, and the first and second sets of electrical windings are wound around each pair of channels and configured to resist motion of the motor during deceleration or under braking thereof.

15. A method of constructing an electric motor, comprising:
providing a stator comprising a cylindrical body and a plurality of teeth extending from the cylindrical body in a radial direction;
winding one or more first sets of electrical conductors around said teeth, wherein the first set(s) of electrical conductors are configured to drive a rotor of the electric motor;
winding one or more second sets of electrical conductors on the stator, wherein the second set(s) of electrical conductors are electrically separate from the first set of electrical conductors; and
electrically connecting the second set of electrical conductors on the stator to a motor controller of the electric motor such that energy produced by the electric motor during a regenerative mode of operation in use is diverted to the second set of electrical conductors on the stator for dissipating the energy produced in the regenerative mode;
wherein the stator comprises a slot extending around an outer circumference of the stator, and the second set of electrical windings are wound around the slot.

* * * * *